(12) United States Patent  
Sugai et al.

(10) Patent No.: US 7,904,781 B2  
(45) Date of Patent: Mar. 8, 2011

(54) DATA TRANSMITTING DEVICE, DATA RECEIVING DEVICE, AND DATA DISTRIBUTION SYSTEM

(75) Inventors: Toyokazu Sugai, Tokyo (JP); Yoshiaki Kato, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 1008 days.

(21) Appl. No.: 11/664,527

(22) PCT Filed: Dec. 9, 2004

(86) PCT No.: PCT/JP2004/018365  
§ 371 (c)(1),  
(2), (4) Date: Apr. 3, 2007

(87) PCT Pub. No.: WO2006/061902  
PCT Pub. Date: Jun. 15, 2006

(65) Prior Publication Data  
US 2007/0300134 A1   Dec. 27, 2007

(51) Int. Cl.  
*H03M 13/00* (2006.01)

(52) U.S. Cl. .......................................... 714/752

(58) Field of Classification Search .................. 714/746, 714/774, 776, 751–752  
See application file for complete search history.

(56) References Cited

U.S. PATENT DOCUMENTS

| | | | |
|---|---|---|---|
| 6,745,364 B2 | 6/2004 | Bhatt et al. | |
| 6,996,097 B1 * | 2/2006 | Chou et al. | 370/389 |
| 7,320,099 B2 * | 1/2008 | Miura et al. | 714/748 |
| 7,539,925 B2 * | 5/2009 | Yamane | 714/774 |
| 2004/0114576 A1 | 6/2004 | Itoh et al. | |

FOREIGN PATENT DOCUMENTS

| | | |
|---|---|---|
| EP | 1061699 A1 | 12/2000 |
| JP | 2000-244560 A | 9/2000 |
| JP | 2001-045098 A | 2/2001 |
| JP | 2001-160824 A | 6/2001 |
| JP | 2002-330118 A | 11/2002 |
| JP | 2003-092564 A | 3/2003 |
| JP | 2004-215224 A | 7/2004 |
| JP | 2004-254127 A | 9/2004 |
| WO | WO-02/17574 A1 | 2/2002 |
| WO | WO-03/021899 A1 | 3/2003 |

OTHER PUBLICATIONS

Chilamkurti et al., "Video Multicasting Using Layered FEC On Split Protocol," Tencon 2004, 2004 IEEE Region 10 Conference, vol. 1, pp. 618-621.

* cited by examiner

*Primary Examiner* — Shelly A Chase  
(74) *Attorney, Agent, or Firm* — Birch, Stewart, Kolasch and Birch, LLP

(57) ABSTRACT

A data transmitting device and a data receiving device which are capable of conducting an error correction using an FEC stream without requiring a feedback from the data receiving device to the data transmitting device are obtained. The data receiving device includes a media packet transmitting unit for transmitting media streams, a plurality of FEC packet calculating units for calculating FEC packets having different parameters, and a plurality of FEC packet transmitting units for transmitting the FEC packets as a FEC stream. Further, the data receiving device includes a media packet receiving unit for acquiring the media packets, an FEC stream selecting and receiving unit for selecting one or a plurality of FEC streams from the plurality of FEC streams to acquire the FEC packets, and a media packet restoring unit for restoring a lost packet by using the FEC packet.

18 Claims, 14 Drawing Sheets

FIG. 6

| FEC STREAM NUMBER | RECEIVING PORT | n | Q |
|---|---|---|---|
| 1 | 40000 | 1 | 24 |
| 2 | 40100 | 2 | 12 |
| 3 | 40200 | 6 | 4 |
| 4 | 40300 | 8 | 3 |
| 5 | 40400 | 12 | 2 |
| 6 | 40500 | 24 | 1 |

FIG. 8

| FEC STREAM NEMBER | RECEIVING POINT |
|---|---|
| 1 | 40000 |
| 2 | 40100 |
| 3 | 40200 |
| 4 | 40300 |
| 5 | 40400 |
| 6 | 40500 |

DATA TRANSMITTING DEVICE, DATA RECEIVING DEVICE, AND DATA DISTRIBUTION SYSTEM

BACKGROUND OF THE INVENTION

1. Field of the Invention

The present invention relates to a data transmitting device, a data receiving device, and a data distribution system, which conduct a data communication via a network.

2. Description of the Related Art

In a conventional data distribution device, as the measures against the loss of a block via the network in data distribution, there is used an FEC (forward error correction). The FEC is a forward error correction using an error correction encoding technique, and a communication system that restores data by the aid of the redundancy added to the data to be transferred without resending the data when detecting the disposal or error of the data.

In the case where a receiver calculator successfully restores original data although the receiver calculator fails to receive several blocks, the receiver calculator transmits an affirmative acknowledgement including reception failure block information such as the identifiers or the number of blocks that fail in a reception to a transmitter calculator.

On the contrary, a transmitter calculator determines a redundancy of FEC encoding in the subsequent data transmission according to the reception failure block information that is returned from the receiver calculator. In this way, the conventional data distribution device optimizes the redundancy of the FEC according to the present receiving status (for example, refer to Patent Document 1).

Patent Document 1: JP 2002-330118 A (page 1, FIG. 4)

However, the conventional art suffers from the following problems. The conventional data distribution device must transmit the reception status or restoration enable/disenable information in each of the blocks in determination of an FEC encoding parameter. In other words, feedback from the receiver calculator side is always required. Therefore, in particular, in the case where multi-distribution system such as an IP multicast is assumed, a response from a large number of receiver calculators in each of the blocks is always required. As a result, there arises such a problem that traffic via the network is increased, or a processing load in the transmitter calculator is increased.

SUMMARY OF THE INVENTION

The present invention has been made to solve the above-mentioned problem, and therefore an object of the present invention is to provide a data transmitting device, a data receiving device, and a data distribution system, which are capable of conducting an error correction by using an FEC stream which is set by a more appropriate parameter without a necessity for a feedback to a data transmitting device from a data receiving device.

A data transmitting device according to the present invention includes: media packet generating means for generating a media packet including encoded media data; media packet transmitting means for transmitting the media packet as a media stream to a network; a plurality of FEC packet calculating means for calculating FEC packets for FEC error correction each having a different redundancy depending on a different parameter in correspondence with the media streams being sent; and a plurality of FEC packet transmitting means for transmitting the respective FEC packets calculated by the plurality of FEC packet calculating means as an FEC stream to the network.

Further, a data receiving device according to the present invention includes: media packet receiving means for receiving a media stream from a network to acquire media packets; FEC stream selecting and receiving means for selectively receiving one or a plurality of FEC streams from a plurality of FEC streams corresponding to the media stream via the network to acquire an FEC packet; and media packet restoring means for determining whether a lost packet exists in a part of the media packets or not on the basis of the media packets acquired by the media packet receiving means, and restoring the lost packet by using the FEC packet acquired by the FEC stream selecting and receiving means in a case where there exists the lost packet.

EFFECT OF THE INVENTION

According to the present invention, the data transmitting device transmits a plurality of FEC streams in advance, and the data receiving device selectively receives the FECs according to those streams. As a result, there can be obtained the data transmitting device, the data receiving device, and the data distribution system, which are capable of conducting the error correction by using the FEC streams that are set by the more appropriate parameter without requiring the feedback to the data transmitting device from the data receiving device.

BRIEF DESCRIPTION OF THE DRAWINGS

FIG. 6 is a diagram showing a data structure of a table which is held in an interior of FEC stream selecting and receiving means according to the first embodiment of the present invention;

FIG. 8 is a diagram showing a data structure of a table which is held in the interior of FEC stream selecting and receiving means according to a second embodiment of the present invention;

DESCRIPTION OF THE PREFERRED EMBODIMENTS

First Embodiment

Figure 1:
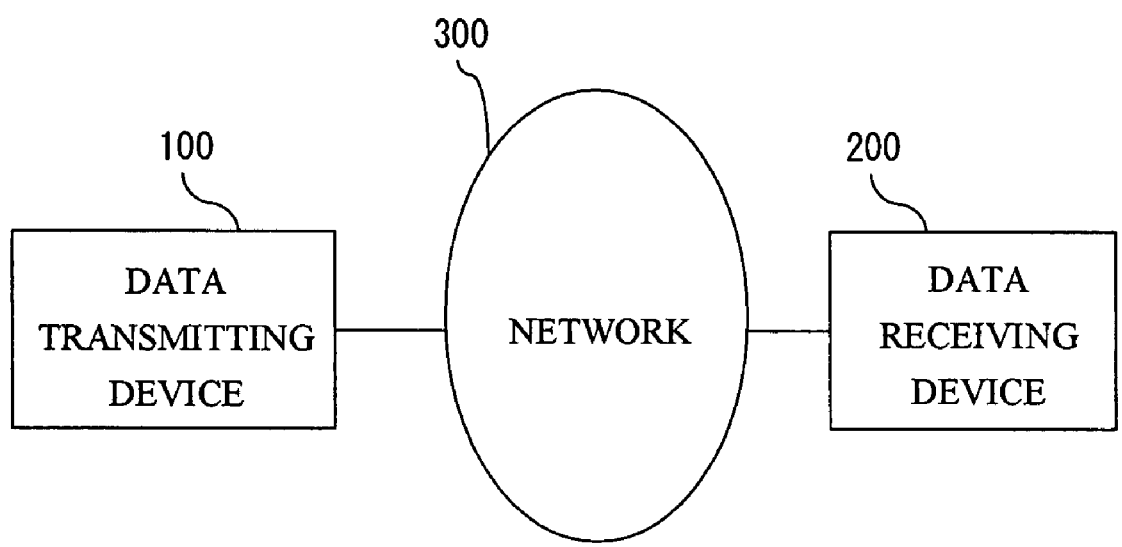
FIG. 1 is a structural diagram showing a data distribution system according to a first embodiment of the present invention.

FIG. 1 is a structural diagram showing a data distribution system according to a first embodiment. The data distribution system is composed of a data transmitting device 100, a data receiving device 200, and a network 300. The data transmitting device 100 and the data receiving device 200 are connected to each other via the network 300. The data transmitting device 100 generates a packet including, for example, media data such as video or audio which has been encoded through an encoding system such as an MPEG (in the following description, the packet including the media data is called "media packet"). Also, the data transmitting device 100 transmits the generated media packet to the data receiving device 200 via the network 300 as a media stream in real time.

On the contrary, the data receiving device 200 acquires the media data such as the encoded video or audio from the media packet that has been received from the data transmitting device 100, and decodes the media data or conducts the storage or reproduction process of the video or audio.

Also, the data transmitting device 100 generates, simultaneously with the media packet, a redundant data packet for FEC error correction corresponding to the media packet (in the following description, called "FEC packet"). In addition, the data transmitting device 100 transmits the generated FEC packet to the data receiving device 200 via the network 300 as an FEC stream in real time.

On the contrary, in the case where the packet loss occurs in the media packet that has been received from the data transmitting device 100, the data receiving device 200 executes a process of restoring the lost packet (packet loss) by the aid of the FEC packet that has been likewise received from the data transmitting device 100. In this example, "packet loss" means a phenomenon in which some packets are lost via the network 300 due to the congestion of the network 300.

Figure 2:
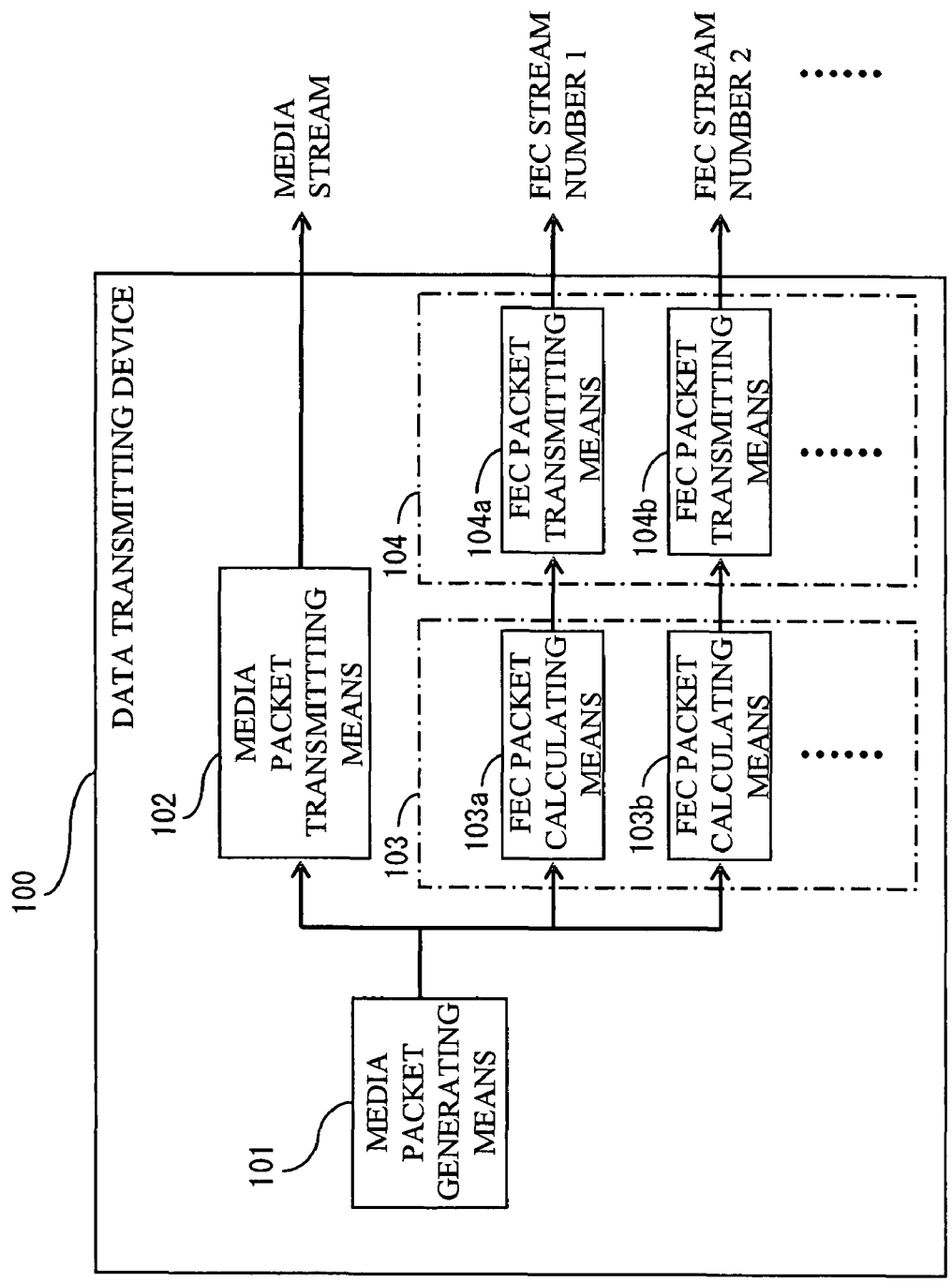
FIG. 2 is an internal structural diagram showing a data transmitting device according to the first embodiment of the present invention.

Then, FIG. 2 is an internal structural diagram showing the data transmitting device 100 according to the first embodiment of the present invention. Referring to FIG. 2, the data transmitting device 100 is composed of media packet generating means 101, media packet transmitting means 102, FEC packet calculating means 103, and FEC packet transmitting means 104.

In this example, in FIG. 2, each of the FEC packet calculating means 103 and the FEC packet transmitting means 104 is composed of a plurality of units, and additional characters "a" and "b" added to the respective numeral references mean "first" and "second", respectively.

The media packet generating means 101 has a function of generating the media packet to be transmitted to the data receiving device 200 from the data transmitting device 100 via the network 300. For example, the media packet generating means 101 corresponds to a video encoder, etc. Alternatively, the media packet generating means 101 may generate the media packet from the media data that is stored locally in advance.

The media packet transmitting means 102 is connected to the network 300, and has a function of transmitting the media packet that has been generated in the media packet generating means 101 to the network 300 as a media stream.

The FEC packet calculating means 103 is means for calculating the FEC packet for error correction on the basis of the media packet that has been generated by the media packet generating means 101. The FEC packet transmitting means 104 is means that is connected to the network 300 for transmitting the redundant data packet that has been outputted from the FEC packet calculating means 103 to the data receiving device 200 via the network 300 as an FEC stream. FIG. 2 shows how an FEC stream 1 is outputted from first FEC packet transmitting means 104a, and an FEC stream 2 is outputted from second FEC packet transmitting means 104.

Figure 3:
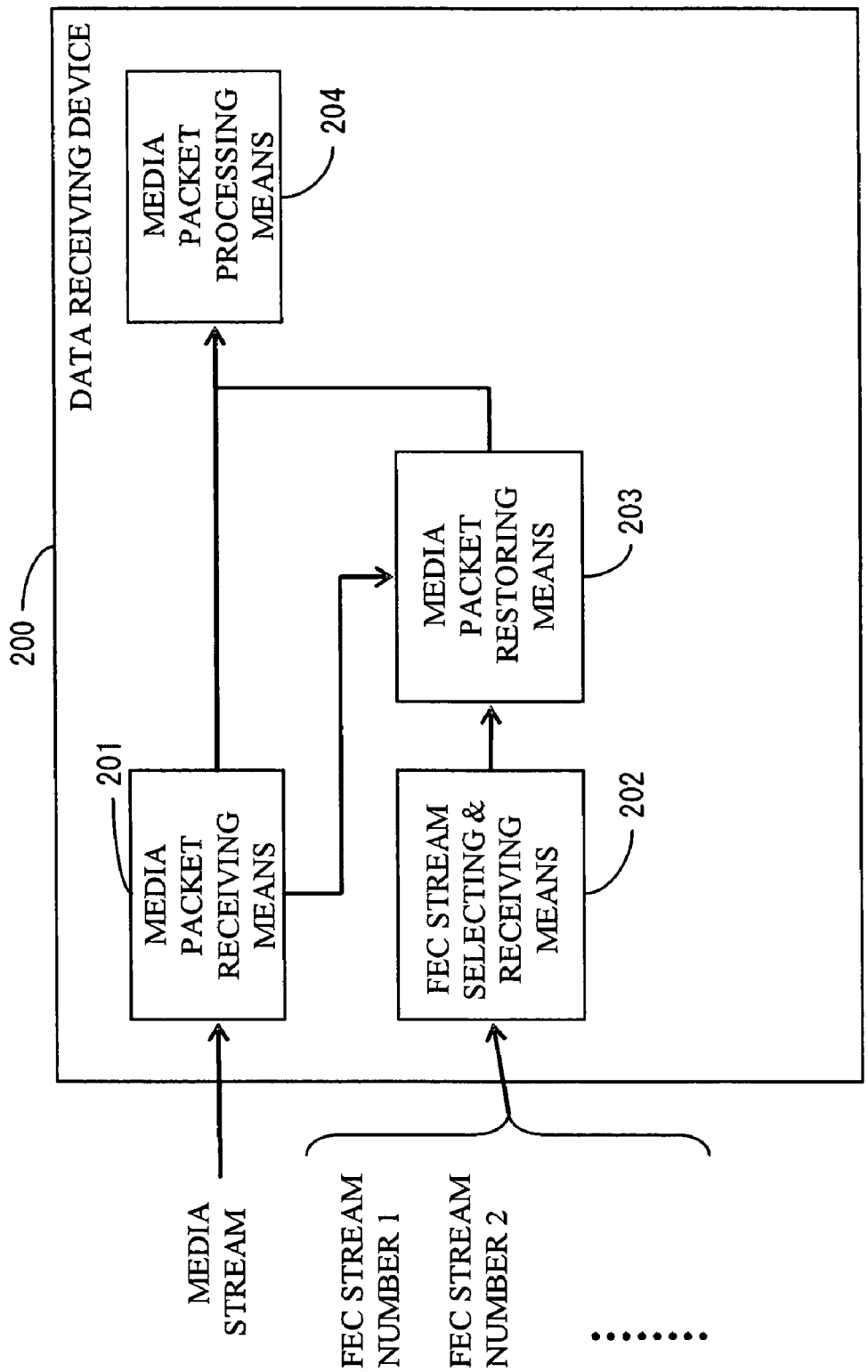
FIG. 3 is an internal structural diagram showing a data receiving device according to the first embodiment of the present invention.

Then, FIG. 3 is an internal structural diagram showing the data receiving device 200 according to the first embodiment of the present invention. Referring to FIG. 3, the data receiving device 200 is composed of media packet receiving means 201, FEC stream selecting and receiving means 202, media packet restoring means 203, and media packet processing means 204.

The media packet receiving means 201 is connected to the network 300, and has a function of receiving the media stream that has been transmitted from the data transmitting device 100 via the network 300 to acquire the media packet, and then outputting the acquired media packet to the media packet restoring means 203 and the media packet processing means 204.

The FEC stream selecting and receiving means 202 is likewise connected to the network 300, and has a function of receiving the FEC packet after selecting one or a plurality of streams from a plurality of FEC streams that are transmitted from the data transmitting device 100 via the network 300, and outputting the received FEC packet to the media packet restoring means 203.

The media packet restoring means 203 checks the packet loss occurrence status with respect to the media packet that has been outputted from the media packet receiving means 201. Then, in the case where the media packet restoring means 203 detects the occurrence of the packet loss, the media packet restoring means 203 conducts the process of restoring the packet loss by the aid of the FEC packet that has been outputted from the FEC stream selecting and receiving means 202. Also, the media packet restoring means 203 outputs the packet that has been successfully restored to the media packet processing means 204.

The media packet processing means 204 receives the media packets that have been outputted from the media packet receiving means 201 and the media packet restoring means 203, respectively, and conducts a process such as decoding or displaying which is associated with the reproduction of media such as video or audio.

Then, the operation of the data distribution system having the above-mentioned functions will be described. First, the operation of the data transmitting device 100 will be described. Referring to FIG. 2, the media packet generating means 101 generates the media data, and divides the generated media data into packets in each of data units. For example, the media packet generating means 101 conducts a dividing process so as to divide the video data that has been encoded by the MPEG encoder in a video frame unit, or in a given number of bytes, to thereby generate the packet.

In addition, the media packet generating means 101 adds header information for packet transmission to the network 300 as needed. For example, in the case of an IP (internet protocol) network, the media packet generating means 101 adds an IP header and an RTP (real-time transport protocol) as the header information, and adds information such as sequence number to the RTP header.

Then, the media packet transmitting means 102 transmits the media packet that has been generated by the media packet generating means 101 to the data receiving device 200 via the network 300 as the media stream.

On the other hand, the FEC packet calculating means 103 calculates the FEC packet for FEC error correction by the aid of the media packet that has been generated by the media packet generating means 101. In this example, a specific example in which XOR (exclusive OR) processing that is an exclusive OR is used as the error correcting process will be described below.

Figure 4:
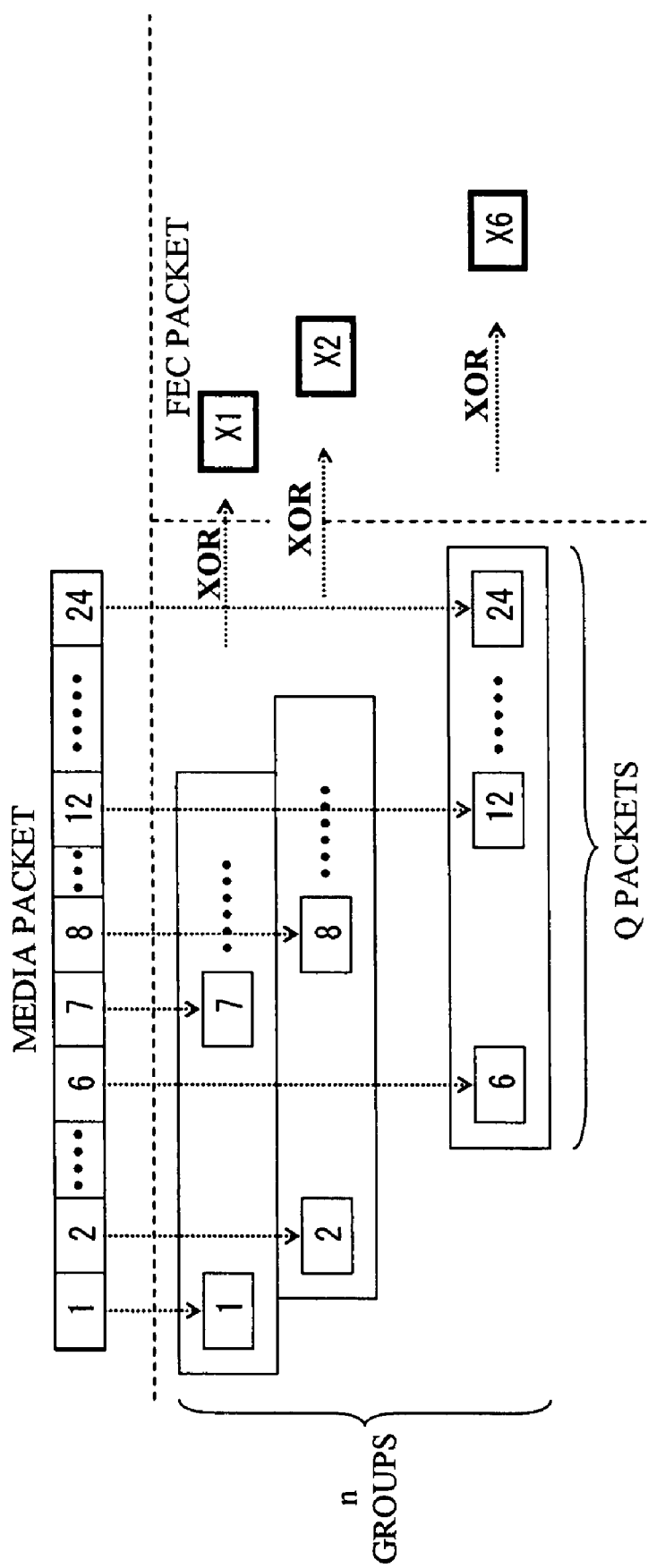
FIG. 4 is an explanatory diagram showing how an FEC packet is calculated in FEC packet calculating means according to the first embodiment of the present invention.

FIG. 4 is an explanatory diagram showing an appearance that calculates the FEC packet in the FEC packet calculating means 103 according to the first embodiment of the present invention. First, the FEC packet calculating means 103 sets n×Q continuous packets as one group with respect to the media packet that has been generated in the media packet generating means 101. Then, the FEC packet calculating means 103 extracts Q packets from the group every n as subgroups. In addition, the FEC packet calculating means 103 conducts the XOR processing in each of bits of the media packets within the respective subgroups of the n groups, to thereby generate one FEC packet with respect to the respective groups.

FIG. 4 shows an example where n is 6 and Q is 4, and sets 6×4=24 continuous packets as one group. For example, the FEC packet calculating means 103 extracts four packets every six packets with a first packet of 24 continuous packets as a head as the first group, to thereby specify a subgroup consisting of first, seventh, thirteenth and nineteenth packets. Likewise, the FEC packet calculating means 103 specifies subgroups as second to sixth groups.

Further, the FEC packet calculating means 103 extracts the media packets of the respective groups as the subgroups, and thereafter conducts the XOR processing in each of the bits of the respective subgroups, to thereby generate FEC packets X1 to X6 corresponding to the six subgroups.

The FEC packets X1 to X6 that have been generated by the FEC packet calculating means 103 as described above are sequentially outputted to the FEC packet transmitting means 104. Then, the FEC packet transmitting means 104 adds the header information and the like to the FEC packet as needed. Further, the FEC packet transmitting means 104 transmits the FEC packet to the data receiving device 200 via the network 300 as the FEC stream.

In this example, as the header information that is added to the FEC packet as needed, there is, for example, information related to the packets that have been subjected to the XOR processing at the time of generating the FEC packet, more specifically, RTP sequence numbers of the media packets. In this case, the FEC packet transmitting means 104 adds the RTP sequence numbers of the first, seventh, thirteenth, and nineteenth media packets as the sequence numbers to the FEC packet X1 as the header information of the FEC packet.

In this example, FIG. 4 exemplifies a case where n is 6 and Q is 4. However, in the case where this system is employed, the values of n and Q are arbitrarily changed, thereby making it possible to change the generation frequency or the intensity of the error tolerance of the FEC packets. Under the circumstances, the data transmitting device 100 according to the present invention sets the respective different values of n and Q between the FEC packet calculating means 103a and the FEC packet calculating means 103b to generate the FEC packets.

For example, it is assumed that the first FEC packet calculating means 103a sets n to 6 and Q to 4, and the second FEC packet calculating means 103b sets n to 1 and Q to 24. In this case, the FEC packet calculating means 103a generates six FEC packets every 24 media packets, and the FEC packet calculating means 103b generates one FEC packet every 24 media packets.

FIG. 2 exemplifies two FEC packet calculating means and two FEC packet transmitting means. However, the numbers of those means are not limited to two, but may be three or more FEC packet calculating means and three or more FEC packet transmitting means as long as a plurality of units are provided. In this case, the respective FEC packet calculating means generate the FEC packets through the FEC packet calculating methods different from each other by the aid of means for changing the values of the parameters n and Q, or by using the values of predetermined different parameters n and Q. The FEC packet calculating method in this case is not also limited to a method of generating the FEC packet on the basis of the XOR processing as described in this embodiment.

Subsequently, the operation of the data receiving device 200 will be described below. Referring to FIG. 3, the media packet receiving means 201 receives the media stream that has been transmitted from the data transmitting device 100 via the network 300, to thereby acquire the media packet. In this situation, it is assumed that the packet loss in which some packets are lost on the network 300 occurs due to the congestion of the network 300.

The FEC stream selecting and receiving means 202 selects one or a plurality of FEC streams among the plurality of FEC streams that have been transmitted from the data transmitting device 101, and receives the selected FEC streams. In addition, the FEC stream selecting and receiving means 202 outputs the received FEC stream to the media packet restoring means 203.

The media packet restoring means 203 receives the media packet from the media packet receiving means 201, and grasps the status of the packet loss. For example, the media packet restoring means 203 checks the missing of the sequence number of the RTP header of the media packet, thereby making it possible to determine the packet loss.

Then, in the case where the media packet restoring means 203 detects the occurrence of the packet loss, the media packet restoring means 203 tries to restore the packet in the following manner. In the case where the RTP sequence number of the lost packet is set as "a", the media packet restoring means 203 retrieves the media packet and the FEC packet which are required to restore the lost packet.

It is assumed that the RTP sequence number of the packet which has been subjected to the XOR processing at the time of generating the FEC packet is recorded in the header information of the FEC packet that has been received from the FEC stream selecting and receiving means 202. In this case, the media packet restoring means 203 first finds out the FEC packet having the RTP sequence number "a" included in the header thereof from the FEC packets that have been received by the FEC stream selecting and receiving means 202. Further, the media packet restoring means 203 searches the RTP packet to be subjected to the XOR processing at the time of generating the FEC packet from the media packets that have been received by the media packet receiving means 201 with reference to the header.

If the media packet restoring means 203 finds out all of the FEC packets and RTP packets, the media packet restoring means 203 calculates the XOR in each of the bits of all the packets, thereby making it possible to restore the data of lost packet. On the other hand, in the case where the media packet restoring means 203 does not find at least one of those FEC packet and RTP packet, it is impossible to restore the media packet. As a result, the media packet restoring means 203 gives up the restoring process.

As described above, the media packet restoring means 203 restores the lost packet by the aid of the media packet that has been received by the media packet receiving means 201, and the FEC packet that has been received by the FEC stream selecting and receiving means 202.

Figure 5:
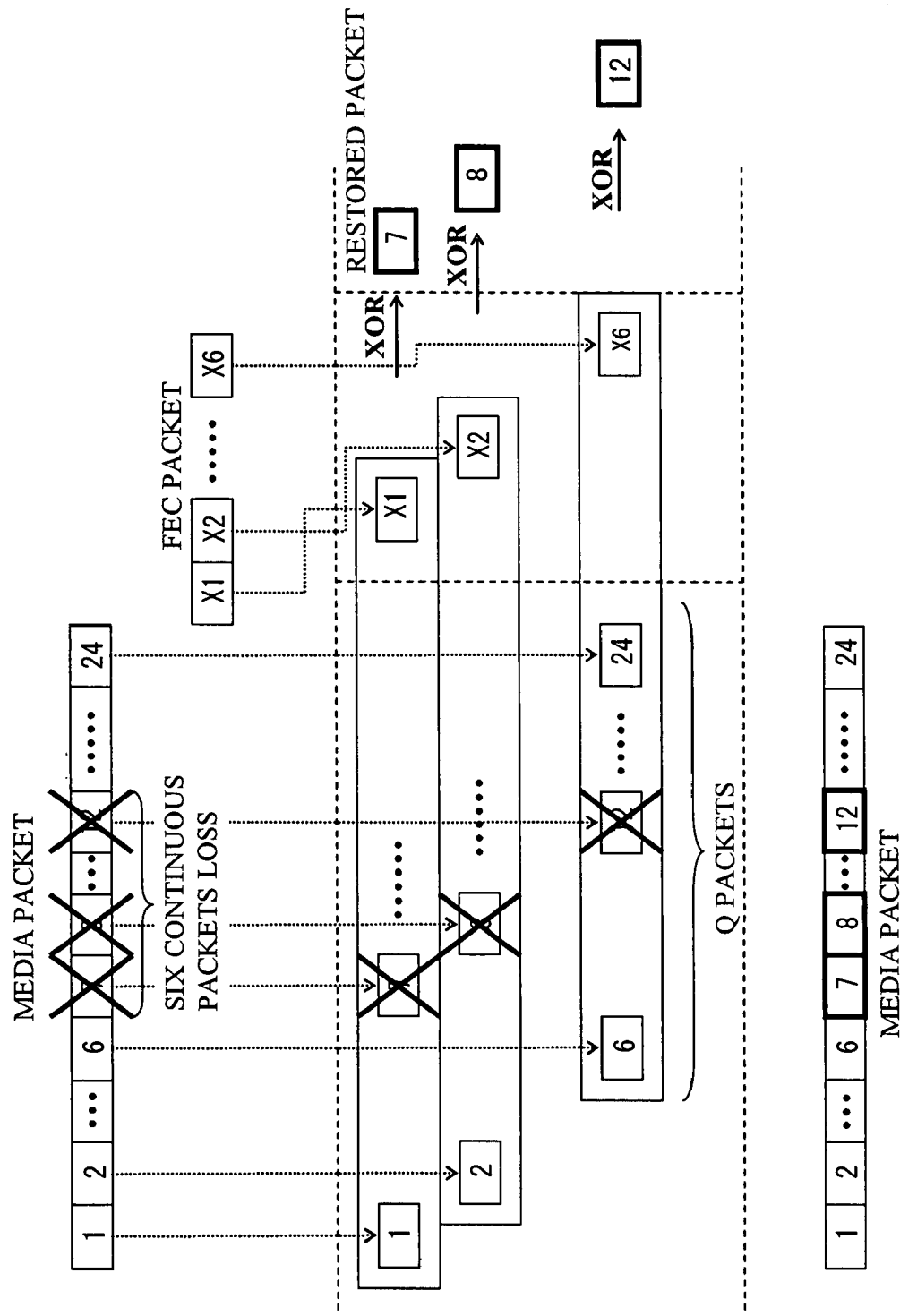
FIG. 5 is an explanatory diagram showing a restoring process by media packet restoring means 203 according to the first embodiment of the present invention.

FIG. 5 is an explanatory diagram showing the restoring process due to the media packet restoring means 203 according to the first embodiment of the present invention. Numbers of the media packet and the FEC packet are identical with those in FIG. 4, and correspond to the case where n is 6 and Q is 4. Referring to FIG. 5, the media packet restoring means 203 takes in 24 continuous media packets that have been received by the media packet receiving means 201 and 6 continuous FEC packets that have been received by the FEC stream selecting and receiving means 202, and conducts the restoring process.

In this example, it is assumed that seventh to twelfth packets, that is, 6 continuous packets, are lost among the media packets. Referring to FIG. 4, since the media packets that generate the FEC packet X1 are first, seventh, thirteenth, and nineteenth media packets, when the XOR operation is conducted on each of the bits of the first, thirteenth, and nineteenth media packets and the FEC packet X1, the seventh media packet can be obtained.

Likewise, the eighth, ninth, tenth, eleventh, and twelfth media packets which are other lost packets can be restored from the XOR operation of the media packet corresponding to the FEC packets X2, X3, X4, X5, and X6, respectively. Therefore, in the example shown in FIG. 5, all of the seventh to twelfth lost packets can be finally restored by the media packet restoring means 203.

The media packets that have been restored in the above-mentioned manner are sequentially sent to the media packet processing means 204 from the media packet restoring means 203. Then, the media packet processing means 204 conducts processing such as decoding or displaying which is associated with the production of media such as video or audio with respect to the media packet that has been sent from the media packet receiving means 201 and the media packet that has been sent from and restored by the media packet restoring means 203 together.

Now, an example of an FEC stream selecting method will be described. FIG. 6 is a diagram showing the data structure of a table which is held in the interior of the FEC stream selecting and receiving means 202 according to the first embodiment of the present invention. It is assumed that the table has receiving ports, and values of the parameters n and Q at the time of generating the FEC packet recorded in correspondence with the respective streams. The FEC stream selecting and receiving means 202 is capable of grasping which FEC stream is generated by which parameter with reference to the table.

Figure 7:
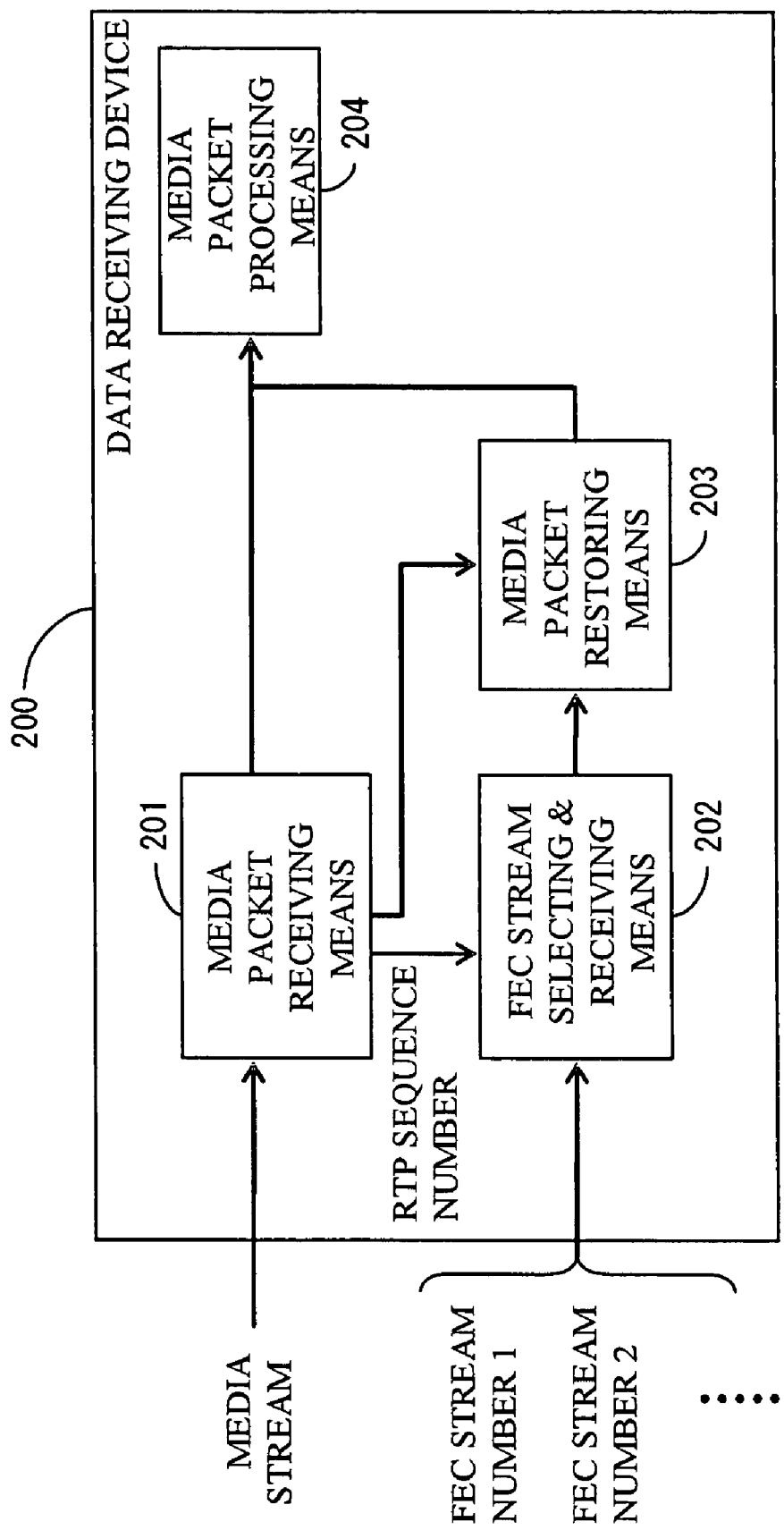
FIG. 7 is a structural diagram showing an example in which media packet receiving means according to the first embodiment of the present invention transmits a packet receiving status thereof to the FEC stream selecting and receiving means.

For example, there is the following criterion of judgment for selecting the stream from the parameters written on the table. FIG. 7 is a structural diagram showing an example in which the media packet receiving means 201 transmits the packet receiving status thereof to the FEC stream selecting and receiving means 202 in the data receiving device according to the first embodiment of the present invention. The media packet receiving means 201 transmits, for example, the RTP sequence number of the media packet to the FEC stream selecting and receiving means 202 as the packet receiving status.

The FEC stream selecting and receiving means 202 calculates information on the packet loss occurrence ratio or the distribution of the burst length according to the transmitted RTP sequence number, and calculates the appropriate values of n and Q. For example, it is assumed that the occurrence ratio of the packet loss is sufficiently low and most burst includes packets of equal to or larger than 2 and equal to or smaller than 6 in the distribution of the burst length.

In this case, the FEC stream selecting and receiving means 202 sets n to 6 so as to restore the burst loss of six continuous packets at the maximum among 24 continuous media packets as in an example of FIG. 4. As a result, the most burst packet loss can be restored, which is effective in the restoration of the packet loss.

Conversely, in the case where n is equal to or smaller than 2, the most burst packet loss cannot be restored, which is not effective in the restoration of the packet loss. Also, as the set value of n is larger, the number of generated FEC packets with respect to the media packets is increased more with the result that the overhead of the stream becomes larger. Accordingly, it is desirable that the set value of n is set as small as possible.

Hence, in the case where the FEC stream selecting and receiving means 202 determines that the restoration capability is sufficient when n is 6 in the table of FIG. 4, the FEC stream selecting and receiving means 202 does not select the FEC stream numbers 4 to 6 corresponding to a case where n is larger than 6, and selects the FEC stream of the FEC stream number 3. In addition, the FEC stream selecting and receiving means 202 receives the FEC stream from the corresponding receiving port number 40200.

The above-mentioned example shows a case where the number of FEC streams that are selected by the data receiving device 200 is only one. However, it can be expected that the data receiving device 200 selects a plurality of FEC streams, and combines the FEC packets thereof with each other to restore the lost packets depending on the criterion of judgment.

Also, even in the case where the packet loss status of the media packet is changed during reception, the FEC stream selecting and receiving means 202 is capable of appropriately reselecting the FEC stream according to a change in the status. Then, the FEC stream selecting and receiving means 202 changes over the received FEC stream on the basis of the reselected result, thereby making it possible to prevent the efficiency of the lost packet restoration from being deteriorated.

According to the first embodiment, the data transmitting device is capable of sending a plurality of different FEC streams in correspondence with the media streams that is being sent. Further, the data receiving device selects one or a plurality of FEC streams from the plurality of FEC streams that have been transmitted via the network in correspondence with the sent FEC streams, thereby making it possible to conduct the process of restoring the loss of the media packet.

Further, the data receiving device is capable of calculating information on the packet loss occurrence ratio on the basis of the received media packet, and is also capable of selecting the appropriate FEC stream on the basis of the calculated information. As a result, the data receiving device is capable of receiving the FEC stream for more appropriately restoring the lost packet with respect to the current receiving status, and it is possible to improve the restoration ratio of the lost packet without basically requiring the feedback from the data receiving device to the data transmitting device.

Second Embodiment

In the first embodiment, the description is given of the case where the data receiving device 200 has the table related to the parameters of the FEC streams shown in FIG. 6 in advance when the data receiving device 200 selects the FEC stream. In a second embodiment, a description will be given of a case where the data receiving device 200 does not have the above-mentioned information in advance when the data receiving device 200 selects the FEC stream. A case where the parameters n and Q are 6 and 4, respectively, as in the first embodiment will be exemplified.

FIG. 8 is a diagram showing the data structure of a table that is held in the interior of the FEC stream selecting and receiving means 202 according to the second embodiment of the present invention. In the data receiving device 200 according to this embodiment, it is assumed that the FEC stream selecting and receiving means 202 has a table of only the port numbers for receiving the FEC streams as shown in FIG. 8. In other words, because the FEC stream cannot be received without knowing the receiving port number, it is assumed that the FEC stream selecting and receiving means 202 acquires information on only the port numbers for receiving the FEC stream as the minimum information in advance, or by some other means.

The FEC stream selecting and receiving means 202 sequentially receives the streams every given period of time (for example, 0.5 seconds) in the order from the FEC stream number 1, or until the FEC stream selecting and receiving means 202 receives the first FEC packet, and presumes the parameter of the FEC packet from the received FEC packet.

For example, in the case where the FEC packet is generated on the basis of the XOR processing as described in the first embodiment, it is assumed that, in the FEC stream number 3, the RTP sequence numbers 1, 7, 13, and 19 of the corresponding media packet have been recorded in the header of the FEC packet that has been first received. Because it is found that the FEC stream selecting and receiving means 202 extracts four RTP packets every six RTP packets to generate the FEC packet, the FEC stream selecting and receiving means 202 is capable of determining that the FEC parameters n and Q described in the first embodiment are 6 and 4, respectively.

As a result, the FEC stream selecting and receiving means 202 determines that the parameters n and Q corresponding to the FEC stream number 3 are 6 and 4, respectively, and adds the parameters to the table. Likewise, the FEC stream selecting and receiving means 202 is capable of conducting the same determination with respect to the FEC stream numbers 1, 2, 4, 5, and 6, and finally completes a table shown in FIG. 6.

According to the second embodiment, the FEC stream selecting and receiving means sequentially receives the plurality of FEC streams for a given short period of time, and receives the header information that is included in the FEC packet, thereby making it possible to grasp the characteristics of the FEC stream that is represented by the parameters of the FEC stream. As a result, the FEC stream selecting and receiving means is capable of executing the determination for selecting the FEC stream without storing the correspondence of the characteristics of the FEC stream with the receiving ports in advance.

In addition, likewise in the case where the characteristic of the FEC stream is changed during the FEC stream reception, the FEC stream selecting and receiving means is capable of responding to the changed FEC stream. In other words, the FEC stream selecting and receiving means sequentially repeats the execution of receiving the FEC streams appropriately or in a given period of time as needed, thereby making it possible to specify the receiving port corresponding to the parameter change with a change in the characteristic of the FEC stream. As a result, the FEC stream selecting and receiving means is capable of restarting the selection optimum of the FEC stream even in the case where the characteristic of the FEC stream is changed during the stream reception.

Third Embodiment

In the first and second embodiments, the description is given of the case where the data transmitting device transmits the plurality of FEC streams each having the independent parameter, and the data receiving device selects a certain stream from those transmitted FEC streams, and restores the packet loss. In a third embodiment, the data transmitting device transmits the plurality of FEC streams having the associations with each other, and the data receiving device receives the FEC streams together, and restores the lost packets, to thereby improve the packet loss restoration ratio.

Figure 9:
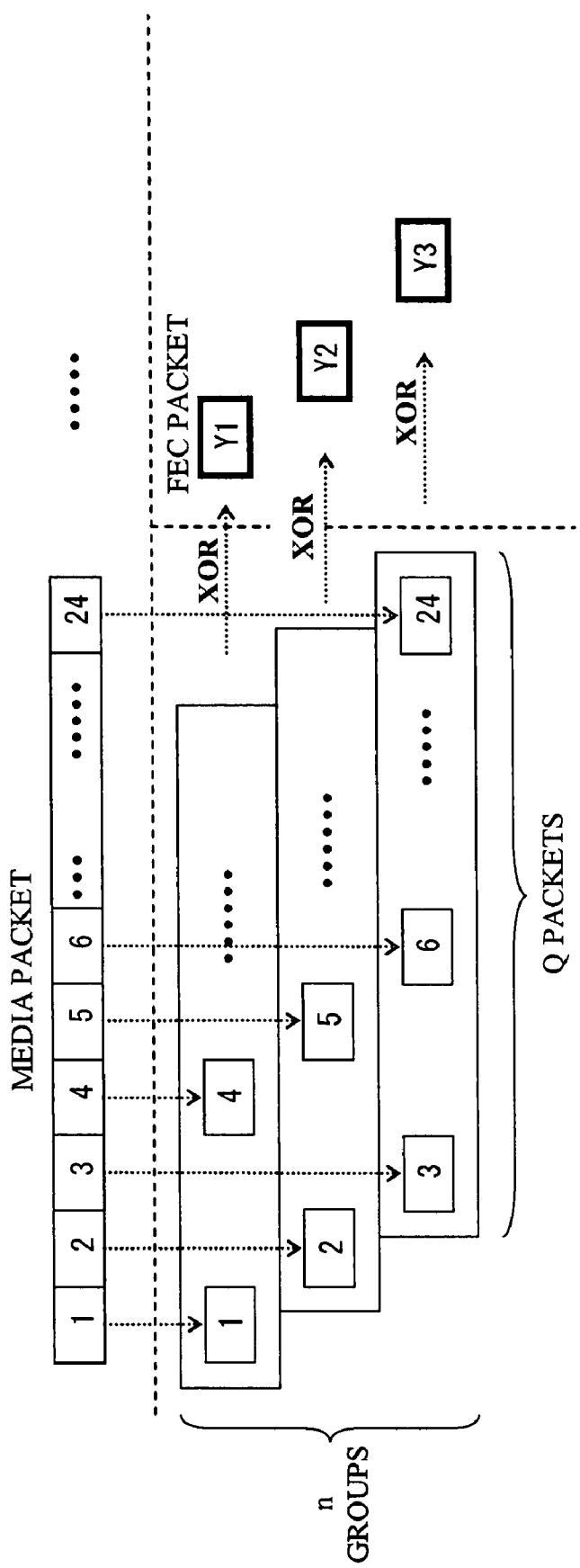
FIG. 9 is an explanatory diagram showing how an FEC packet is calculated in first FEC packet calculating means according to a third embodiment of the present invention.

In the data transmitting device 100 shown in FIG. 2, let us consider a case where two FEC packet calculating means 103a and 103b calculate the FEC streams that are associated with each other. FIG. 9 is an explanatory diagram showing how the FEC packet is calculated in the first FEC packet calculating means 103a according to the third embodiment of the present invention. Referring to FIG. 9, it is assumed that the FEC packet calculating means 103a generates FEC packets Y1 to Y3 with the parameters n and Q of 3 and 8, respectively.

On the other hand, it is assumed that the second FEC packet calculating means 103b generates only three FEC packets X1 to X3 among the FEC packets with the parameters n and Q of 6 and 4, respectively, as shown in FIG. 4.

Figure 10:
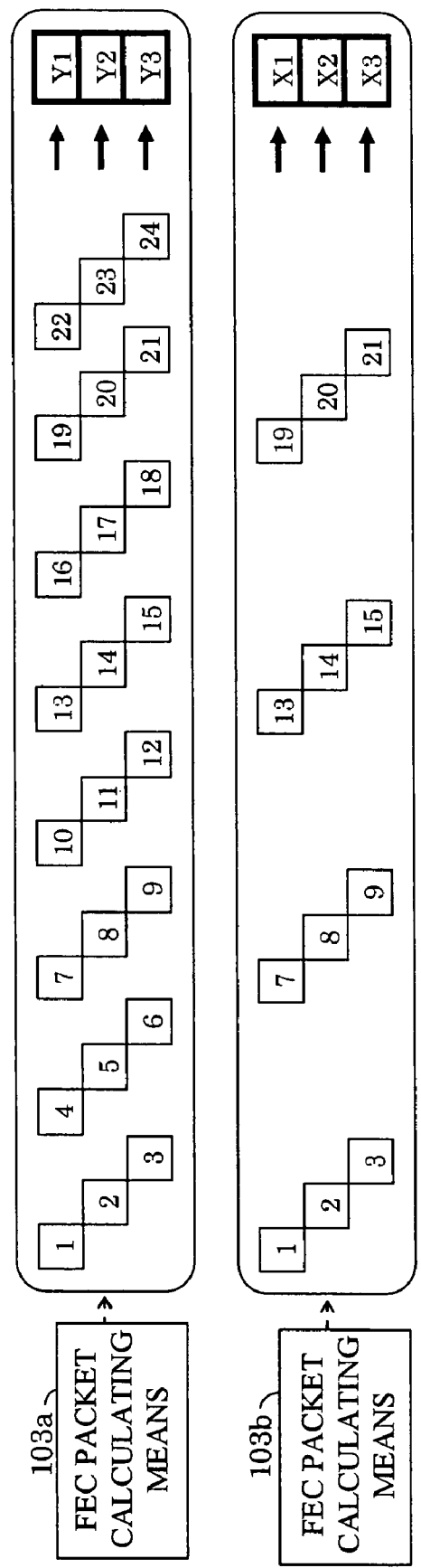
FIG. 10 is a diagram showing an FEC packet that is generated by two FEC packet calculating means according to the third embodiment of the present invention.

FIG. 10 is a diagram showing the FEC packets that are generated by two FEC packet calculating means 103a and 103b according to the third embodiment of the present invention. In other words, the first FEC packet calculating means 103a calculates, for example, the XOR of the first, fourth, seventh, tenth, thirteenth, sixteenth, nineteenth, and twenty-second media packets, to thereby generate the FEC packet Y1. On the other hand, the second FEC packet calculating means 103b calculates, for example, the XOR of the first, seventh, thirteenth, and nineteenth media packets, to thereby generate the FEC packet X1.

Figure 11:
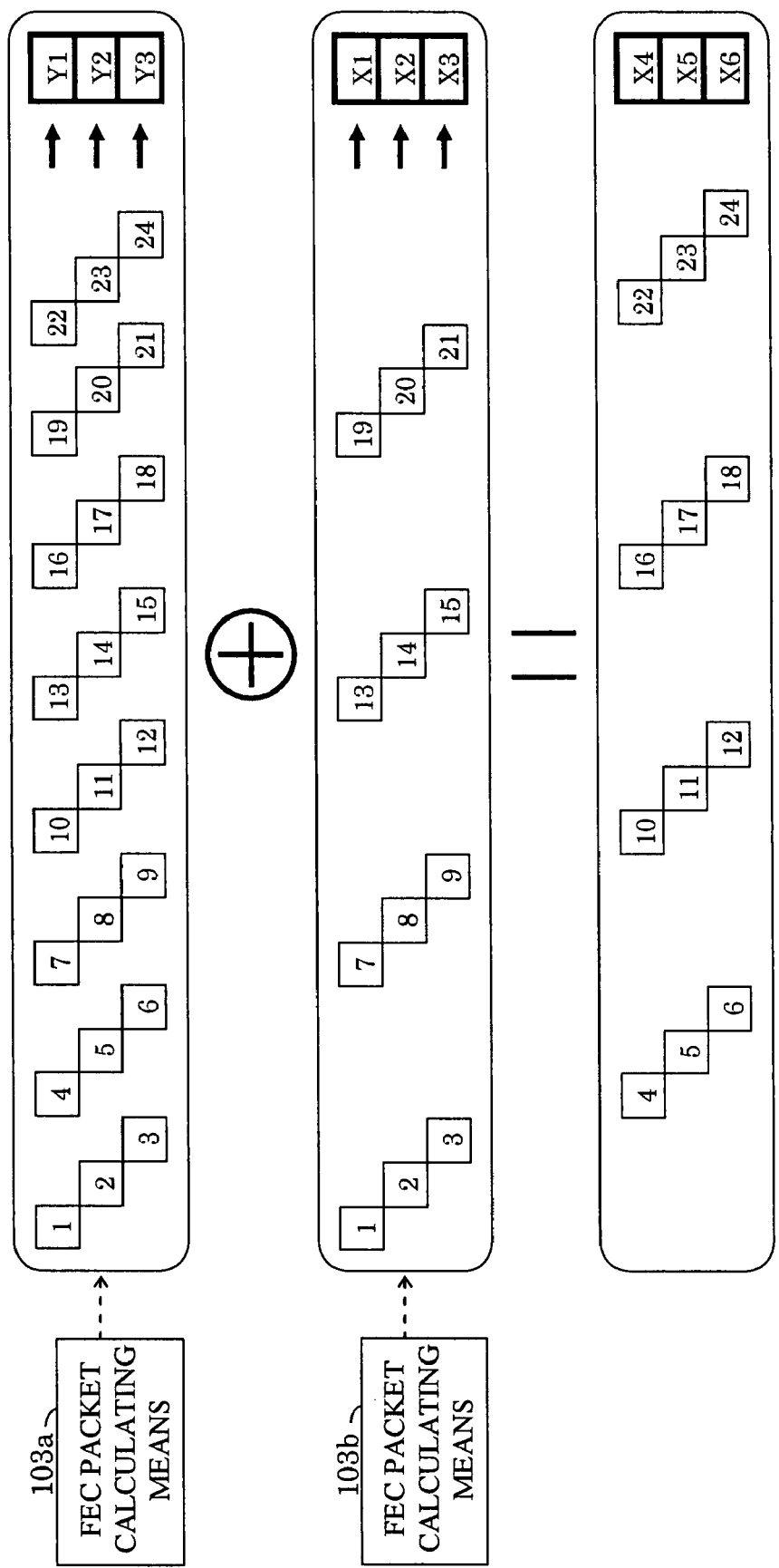
FIG. 11 is a diagram showing a case of conducting XOR operation of the FEC packet that is generated by the two FEC packet calculating means according to the third embodiment of the present invention.

FIG. 11 is a diagram showing a case of conducting the XOR operation of the FEC packets that are generated by the two FEC packet calculating means 103a and 103b according to the third embodiment of the present invention. For example, it is assumed that the XOR of the FEC packet Y1 and the FEC packet X1 in each of the bits are calculated.

In this case, since the FEC packet Y1 is the XOR of the first, fourth, seventh, tenth, thirteenth, sixteenth, nineteenth, and twenty-second media packets, and the FEC packet X1 is the XOR of the first, seventh, thirteenth, and nineteenth media packets, the first, seventh, thirteenth, and nineteenth media packets which are overlapped between the FEC packet Y1 and the FEC packet X1 negate each other. Therefore, the calculation result of the XOR of the Y1 and the X1 is identical with that obtained by calculating the fourth, tenth, sixteenth, and twenty-second media packets that are not overlapped between the FEC packet Y1 and the FEC packet X1.

The calculation results correspond to the FEC packet X4 of FIG. 4. Likewise, the FEC packet X5 is obtained by the XOR operation of the FEC packets Y2 and X2. Further, the FEC packet X6 is obtained by the XOR operation of the FEC packets Y3 and X3. Accordingly, the data receiving device 200 receives both of the FEC streams that are calculated by the two FEC packet calculating means 103a and 103b, thereby making it possible to obtain the same packet loss restoring effects as those in the case of receiving the FEC stream having n of 6 and Q of 4.

In the process of restoring the lost packet of the RTP sequence number "a", the data receiving device 200 according to the first or second embodiment finds out the FEC packet having the RTP sequence number "a" included in the header thereof and the RTP packet to be subjected to the XOR processing at the time of generating the FEC packet from the received media packets according to the received FEC packet. Then, in the case where the data receiving device 200 does not find at least one of those FEC packet and RTP packet, because the data receiving device 200 according to the first or second embodiment is incapable of restoring the media packet, the data receiving device 200 gives up the restoring process.

On the contrary, the data receiving device 200 according to the third embodiment treats even a case of giving up the restoring process in the first embodiment as described above as a case where the possibility of restoration still remain, in the case where there exist a plurality of FEC packets including the RTP sequence number "a" therein. The specific processing contents will be described below.

Figure 12:
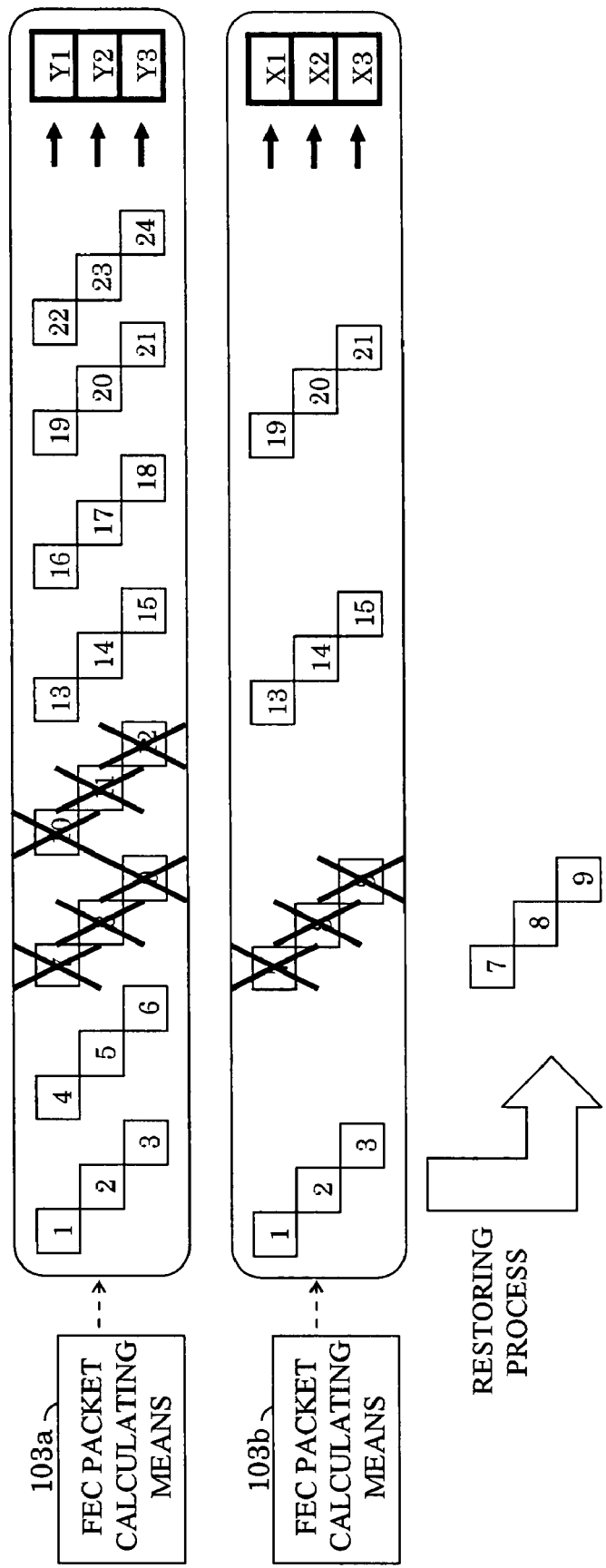
FIG. 12 is a diagram showing a relationship between a lost packet and the FEC packet that is generated by the two FEC packet calculating means according to the third embodiment of the present invention.

It is assumed a case where seventh to twelfth media packets, that is, 6 continuous media packets, are lost as in the case shown in FIG. 6 according to the first embodiment. FIG. 12 is a diagram showing a relationship between the FEC packet and the lost packet which are generated by the two FEC packet calculating means 103a and 103b according to the third embodiment of the present invention, and represents a case where seventh to twelfth media packets, that is, 6 continuous media packets, are lost.

In this case, the FEC packets Y1, Y2, and Y3 which are outputted by the first FEC packet calculating means 103a cannot be restored in the simple XOR processing because two corresponding media packets are lost in each FEC packet.

However, in the FEC packets X1, X2, and X3 which are outputted by the second FEC packet calculating means 103b, the lost packets can be restored because only one corresponding media packets are lost in each FEC packet. As a result, the media packet restoring means 203 conducts the process of restoring the seventh, eighth, and ninth media packets.

Figure 13:
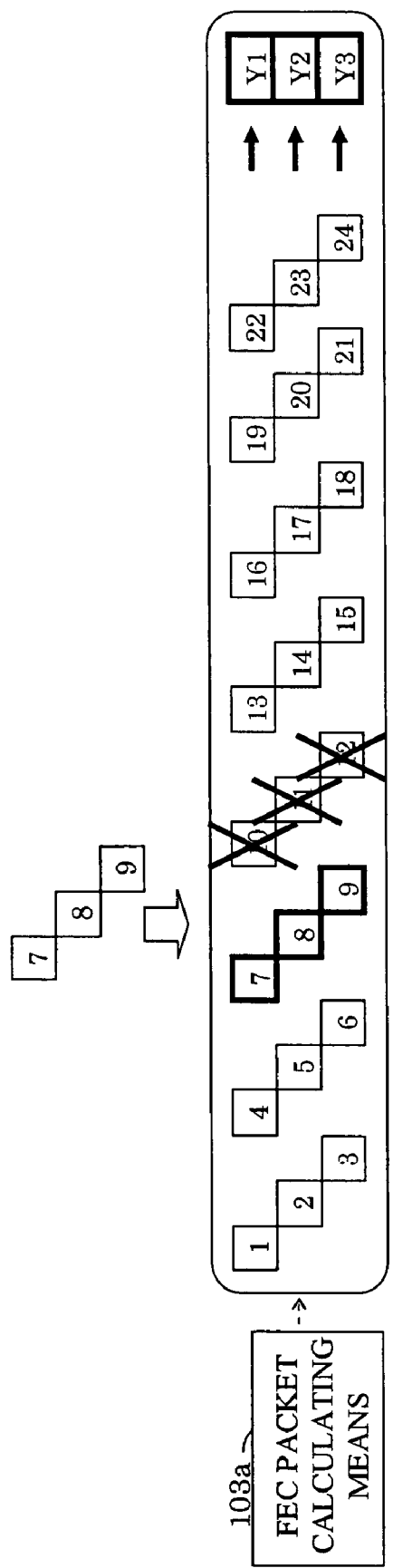
FIG. 13 is a diagram showing how a media packet and the FEC packet that is generated by the first FEC packet calculating means are restored according to the third embodiment of the present invention.

FIG. 13 is a diagram showing how the FEC packet and the media packet which are generated by the first FEC packet calculating means 103a are restored according to the third embodiment of the present invention. FIG. 13 shows a case where the seventh to ninth media packets which have been restored by the FEC packets X1, X2, and X3 which have been outputted by the second FEC packet calculating means 103b are reflected in the case where seventh to twelfth media packets, that is, 6 continuous media packets, are lost.

In the case the above-mentioned restoring process has been reflected, the FEC packets Y1, Y2, and Y3 has the same appearance as that in the case where only one media packet corresponding to the respective FEC packets is lost. Accordingly, the media packet restoring means 203 is capable of restoring the tenth, eleventh, and twelfth lost packets.

As described above, even in the case where there exist a plurality of FEC packets corresponding to the lost packet, the restorable FEC packet is applied to partially restore the lost packet, to thereby enlarge the range of restoring the lost packet by the FEC packet. Also, the plurality of FEC packets having the above-mentioned association are used, thereby making it possible to obtain the same restoring effect as that in the case of using the plurality of independent FEC packets having no association with each other. As a result, the number of FEC packets to be used can be reduced, thereby making it possible to reduce the bandwidth that is required for the distribution of the FEC streams.

Figure 14:
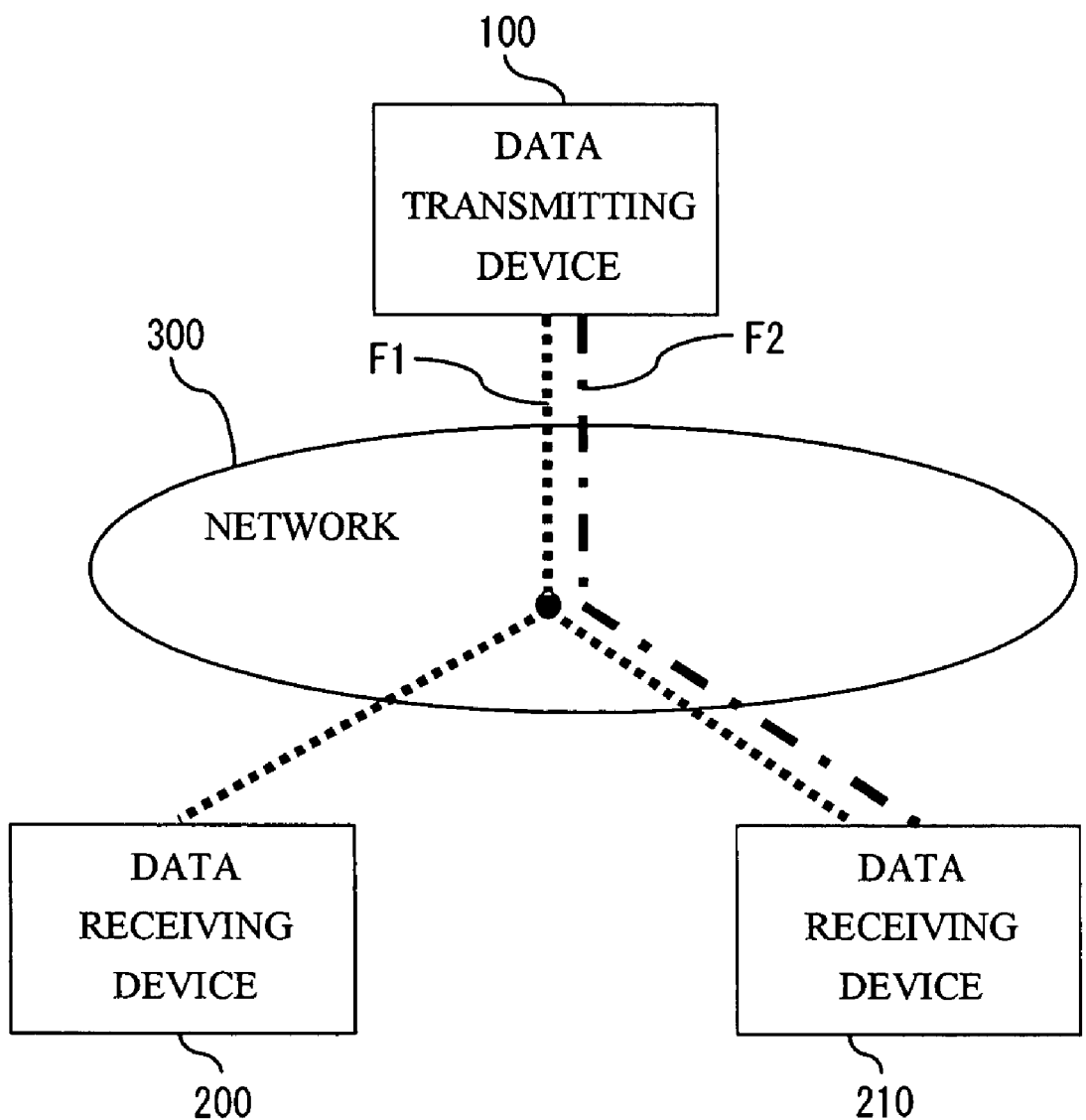
FIG. 14 is a structural diagram showing a distribution system which is composed of a data transmitting device, two data receiving devices, and a network according to the third embodiment of the present invention.

A data distribution system using the data transmitting device 100 and the data receiving device 200 which have the above-mentioned functions will be described. FIG. 14 is a structural diagram showing a distribution system which is composed of the data transmitting device 100, two data receiving devices 200, 210, and the network 300 in the third embodiment of the present invention. In this example, the data transmitting device 100 sends an FEC stream F1 from the FEC packet transmitting means 104a, and sends an FEC stream F2 from the FEC packet transmitting means 104b.

Also, the FEC packets that are calculated by the two FEC packet calculating means 103a and 103b are as described above. In addition, the FEC stream F1 is received by both of the data receiving devices 200 and 210, and the FEC stream F2 is received by only the data receiving device 210. In this situation, the data receiving device 200 is limited to a device that is capable of restoring the burst loss of three continuous media packets at the maximum among 24 media packets with respect to the packet loss restoring capability although there are the overheads of only three FEC packets with respect to 24 continuous media packets.

On the other hand, the data receiving device 210 has the overheads of six FEC packets with respect to 24 continuous media packets, but is capable of restoring the burst loss of six continuous media packets at the maximum among 24 media packets with respect to the packet loss restoration capability. With the above-mentioned configuration, it is possible to reduce the bandwidth of the network required for the stream distribution as compared with a case of transmitting the FEC streams of the different parameters, for example, both of the FEC stream having n of 3 and Q of 8 and the FEC stream having n of 6 and Q of 4.

According to the third embodiment, the data transmitting device transmits the plurality of FEC streams having the association with each other, and the data receiving device receives those FEC streams together. As a result, it is possible to reduce the bandwidth required for the distribution of the FEC stream as compared with the case of transmitting the plurality of independent FEC streams having no association with each other and selecting the FEC streams that are received in each of the data receiving devices.

What is claimed is:
1. A data transmitting device, comprising:
 a media packet generating unit for generating a media packet including encoded media data;
 a media packet transmitting unit for transmitting the media packet as a media stream to a network;
 a plurality of FEC packet calculating units for calculating FEC packets for FEC error correction each having a different redundancy depending on a different parameter in correspondence with the media streams being sent, wherein each FEC packet is calculated by conducting an XOR operation on a plurality of corresponding media packets, and each FEC packet calculating unit has a different generation frequency for the FEC packets; and a plurality of FEC packet transmitting units for transmitting the respective FEC packets calculated by the plurality of FEC packet calculating means as an FEC stream to the network.

2. The data transmitting device according to claim 1, wherein the media packet generating unit generates a media packet to which header information is added.

3. The data transmitting device according to claim 1, wherein each of the plurality of FEC packet calculating units calculates the FEC packet so as to have an association with the FEC packet calculated by other FEC packet calculating unit.

4. A data receiving device, comprising:
a media packet receiving unit for receiving a media stream from a network to acquire media packets;
an FEC stream selecting and receiving unit for selectively receiving one or a more FEC streams from a plurality of FEC streams corresponding to the media stream via the network to acquire an FEC packet; and
a media packet restoring unit for determining whether a lost packet exists in a part of the media packets or not on the basis of the media packets that are acquired by the media packet receiving unit, and restoring the lost packet by using the FEC packet acquired by the FEC stream selecting and receiving unit in a case where there exists the lost packet,
wherein the FEC stream selecting and receiving unit calculates information on a distribution of burst length for the received media stream, and uses the calculated information to select the one or more FEC streams to be received from the plurality of FEC streams corresponding to the media stream.

5. A data receiving device, comprising:
a media packet receiving unit for receiving a media stream from a network to acquire media packets;
an FEC stream selecting and receiving unit for selectively receiving one or a plurality of FEC streams from a plurality of FEC streams corresponding to the media stream via the network to acquire an FEC packet; and
a media packet restoring unit for determining whether a lost packet exists in apart of the media packets or not on the basis of the media packets that are acquired by the media packet receiving unit, and restoring the lost packet by using the FEC packet acquired by the FEC stream selecting and receiving unit in a case where there exists the lost packet,
wherein the media packet receiving means receives the media stream including header information therein, and transfers the header information to the FEC stream selecting and receiving unit, and
wherein the FEC stream selecting and receiving unit estimates the occurrence status of the packet loss on the basis of the transferred header information, and specifies one or a plurality of FEC streams to be selected from the plurality of FEC streams via the network according to the estimated occurrence status, and receives the specified FEC streams to acquire the FEC packet.

6. The data receiving device according to claim 5, wherein the FEC stream selecting and receiving unit includes a storage unit that stores a table indicative of a correspondence between a parameter at a time of calculating each FEC packet and a receiving port with respect to a plurality of FEC stream numbers in advance, specifies one or a plurality of stream numbers to be selected from the table and the corresponding communication ports according to the estimated occurrence status, and receives a desired FEC stream from the plurality of FEC streams via the network.

7. The data receiving device according to claim 5, wherein the FEC selecting and receiving unit includes a storage unit that stores a table indicative of a correspondence of a plurality of FEC stream numbers, and a plurality of receiving ports in advance, sequentially receives the plurality of FEC streams including the header information from the respective communication ports stored in the table, specifies a parameter at the time of calculating the FEC packet on the basis of the header information included in the respective received FEC streams, stores the specified parameters in correspondence with the FEC stream numbers of the table stored in the storage unit, specifies one or a plurality of FEC stream numbers to be selected and a corresponding communication port from the table according to the estimated occurrence status, and receives a desired FEC stream from the plurality of FEC streams via the network.

8. The data receiving device according to claim 7, wherein the FEC stream selecting and receiving unit appropriately repeatedly conducts a process of sequentially receiving the plurality of FEC streams corresponding to the media streams via the network and specifying the parameter to appropriately update the table in the storage unit.

9. The data receiving device according to claim 4,
wherein the FEC stream selecting and receiving unit selectively receives a plurality of FEC streams having an association with each other from the plurality of FEC streams corresponding to the media streams via the network to acquire a plurality of FEC packets having an association with each other, and
wherein the media packet restoring unit restores the lost packet by using the plurality of FEC packets having the association with each other which are acquired by the FEC stream selecting and receiving unit.

10. A data distribution system, comprising:
the data receiving device according to claim 5; and
a data transmitting device including:
a media packet generating unit for generating the media stream via the network,
a plurality of FEC packet calculating units for calculating the respective FEC packets to be included in the plurality of FEC streams corresponding to the media stream, and
a plurality of FEC packet transmitting units for transmitting the respective FEC streams via the network.

11. A method for generating and transmitting media streams, comprising:
generating a media packet including encoded media data;
transmitting the media packet as a media stream to a network;
generating a plurality of FEC streams, each FEC stream providing FEC packets for FEC error correction of a different redundancy dependent on a different parameter in corresponding with the media streams being sent, each FEC packet being calculated by conducting an XOR operation on a plurality of corresponding media packets such that the FEC packet is operable to restore any one of the corresponding media packets on the basis of the other corresponding media packets; and
transmitting the respective FEC streams to the network.

12. The method according to claim 11, wherein header information is added to a generated media packet.

13. The method according to claim 11, wherein an FEC packet of each FEC stream is calculated so as to have an association with an FEC packet of another FEC stream.

14. A method for receiving data, comprising:
receiving a media stream from a network to acquire media packets;

selectively receiving one or a plurality of FEC streams from a plurality of FEC streams corresponding to the media stream via the network to acquire an FEC packet;

determining whether a lost packet exists in a part of the media packets or not on the basis of the media packets that are acquired by the media packet receiving unit; and restoring the lost packet by using the acquired FEC packet in a case where there exists the lost packet, wherein the received media stream includes header information therein, and wherein the selectively receiving step includes:
estimating the occurrence status of the packet loss on the basis of the header information, specifying one or a plurality of FEC streams to be selected from the plurality of FEC streams via the network according to the estimated occurrence status, and receiving the specified FEC streams to acquire the FEC packet.

15. The method according to claim 14, further comprising storing a table in a storage unit indicative of a correspondence between a parameter at a time of calculating each FEC packet and a receiving port with respect to a plurality of FEC stream numbers in advance, wherein the selectively receiving step further includes specifying one or a plurality of stream numbers to be selected from the table and the corresponding communication ports according to the estimated occurrence status.

16. The method according to claim 14, further comprising storing a table in a storing unit indicative of a correspondence of a plurality of FEC stream numbers, and a plurality of receiving ports in advance, wherein the selectively receiving step further includes:
sequentially receiving the plurality of FEC streams including the header information from the respective communication ports stored in the table, specifying a parameter at the time of calculating the FEC packet on the basis of the header information included in the respective received FEC streams, and storing the specified parameters in correspondence with the FEC stream numbers of the table stored in the storage unit, specifies one or a plurality of FEC stream numbers to be selected and a corresponding communication port from the table according to the estimated occurrence status.

17. The method according to claim 16, wherein the selectively receiving step appropriately repeatedly conducts a process of sequentially receiving the plurality of FEC streams corresponding to the media streams via the network, and specifying the parameter to appropriately update the table in the storage unit.

18. The data receiving device according to claim 14,
wherein the selectively receiving step selectively receives a plurality of FEC streams having an association with each other from the plurality of FEC streams corresponding to the media streams via the network to acquire a plurality of FEC packets having an association with each other, and wherein the restoring step restores the lost packet by using the acquired plurality of FEC packets having the association with each other.

* * * * *